W. B. HUBARD.
Combined Harvester and Thrasher.
No. 134,476.            Patented Dec. 31, 1872.
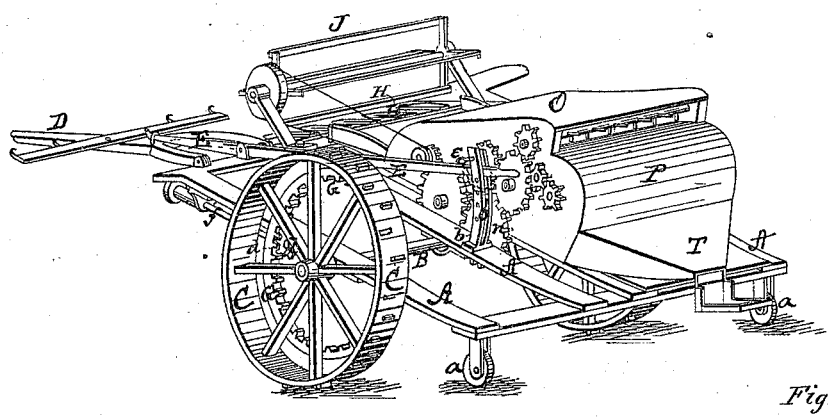
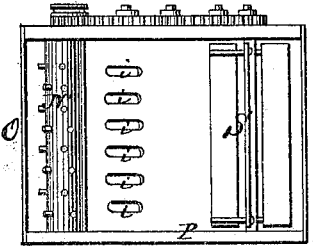
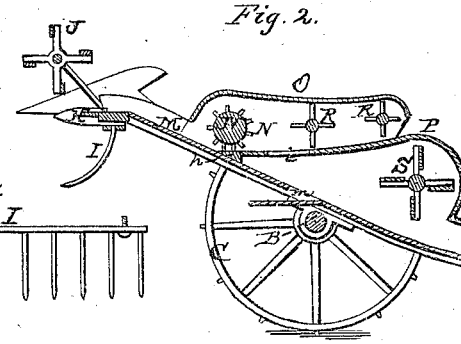
Witness:                  Inventor.
Henry N. Miller         William B. Hubard
C. L. Evert           per Alexander Mason
                          Attorneys.

UNITED STATES PATENT OFFICE.

WILLIAM B. HUBARD, OF ARRINGTON DEPOT, VIRGINIA.

IMPROVEMENT IN COMBINED HARVESTERS AND THRASHERS.

Specification forming part of Letters Patent No. 134,476, dated December 31, 1872.

*To all whom it may concern:*

Be it known that I, WILLIAM B. HUBARD, of Arrington Depot, in the county of Nelson and in the State of Virginia, have invented certain new and useful Improvements in Wheat Header, Thrasher, and Separator; and do hereby declare that the following is a full, clear, and exact description thereof, reference being had to the accompanying drawing and to the letters of reference marked thereon making a part of this specification.

The nature of my invention consists in the construction and arrangement of a machine for cutting off the heads of wheat and thrashing and separating the same, as will be hereinafter more fully set forth.

In order to enable others skilled in the art to which my invention appertains to make and use the same, I will now proceed to describe its construction and operation, referring to the annexed drawing, in which—

Figure 1 is a perspective view, and Fig. 2 a longitudinal vertical section, of my machine. Fig. 3 is an inverted view of the casing containing the thrashing and separating parts of my machine; and Fig. 4 is a front view of a rake attached under the cutter-bar.

A represents the frame of my machine, at or about the center of which, on the under side, are suitable journal-boxes for the reception of the axle B, which has a driving-wheel, C, on each end. The rear end of the machine is supported upon two small wheels *a a*, but when the machine is in operation the front end is held at any desired height by means of the tongue D and regulating-lever E. The tongue D is hinged or pivoted to the front of the frame A, at or near its left side, and the regulating-lever E is also pivoted to the front part of the frame. The front end of the lever E forms a hook which passes into a staple on the tongue, and the rear end of the lever is held between standards *b* on the frame by a pin, *e*, as shown in Fig. 1. By raising and lowering the lever between said standards the height of the front end of the machine is readily regulated. On the inner side of the left driving-wheel C is secured a wheel, G, cogged on its inner circumference and gearing with a pinion, *d*. The shaft upon which this pinion is placed is by bevel-gearing connected with a shaft, *f*, which runs forward to the front end of the frame A, and has upon its forward end a crank-wheel connected by a pitman with the cutter-bar H, thus imparting the necessary reciprocating motion to the same. Under the cutter-bar H is attached a rake, I, the teeth of which are curved forward at their lower ends, as shown in Fig. 2, for the purpose of raising tangled grain. This rake may be attached and detached at will. Above the cutter-bar H is a reel, J, which throws the wheat-heads cut off by the cutter-bar onto the contracting inclined plane M. Upon this plane the heads slide down till they are caught by the revolving thrashing-cylinder N, operating upon or in connection with a toothed board, *h*, placed across said inclined plane. This thrashing-cylinder N is located in the front end of a casing, O, placed on top of another casing, P, as shown in Fig. 2. In rear of the thrashing-cylinder, in the bottom of the casing O, (which is also the top of the casing P,) are a number of slots, *i i*, through which the grain thrashed by the said cylinder N falls down into the casing P, while the straw is carried out through the rear end of the casing by means of one or more revolving rakes, R R. Any chaff or other light stuff that falls down with the grain through the slots *i i* is blown out through the passage *m* in the bottom of the casing P, by means of the revolving fan S, located in the rear end of said casing, while the grain alone passes down through a contracted conductor, T. At the mouth of this conductor I propose to arrange a platform upon which the bags are to rest, so that the grain will fall into the bags; also a receptacle for empty bags, and a seat for the bagman. The thrashing-cylinder N, rakes R R, and fan S are revolved by suitable gearing from a cog-wheel, *n*, on the axle B, and the reel J is revolved by a belt or band from one of said gear-wheels. The revolving rakes R R may be dispensed with by giving the fan S the required velocity, so that it will blow out the straw as well as the chaff. In such case the casings O and P must be somewhat differently constructed so as to allow the fan to operate on the straw also.

Having thus fully described my invention, what I claim as new, and desire to secure by Letters Patent, is—

1. The casings O P provided with the openings described, and carrying the fan S and thrasher N, used in combination with the main axle and frame of a reaping-machine, all constructed substantially as herein described.

2. In combination with the above, the rakes R R, constructed and arranged substantially as and for the purposes set forth.

3. The combination of the cutter-bar H, detachable rake I, reel J, inclined plane M, casings O P, thrasher N, rakes R, fan S, and conductor T, when said parts are constructed and arranged together in one machine, as herein shown and described.

In testimony that I claim the foregoing I have hereunto set my hand this 13th day of September, 1872.

WM. B. HUBARD.

Witnesses:
    C. L. EVERT,
    JOHN SMITH.